United States Patent [19]

Brinkmann et al.

[11] Patent Number: 4,951,534
[45] Date of Patent: Aug. 28, 1990

[54] BELOW-FLOOR LATHE FOR REGRINDING THE TIRES OF RAILROAD-VEHICLE WHEEL SETS

[75] Inventors: Dirk Brinkmann, Lünen-Niederaden; Manfred Reyer, Dortmund, both of Fed. Rep. of Germany

[73] Assignee: Hoesch Maschinenfabrik Deutschland AG, Dortmund, Fed. Rep. of Germany

[21] Appl. No.: 378,080

[22] Filed: Jul. 11, 1989

[30] Foreign Application Priority Data

Jul. 14, 1988 [DE] Fed. Rep. of Germany ....... 3823823

[51] Int. Cl.⁵ .......................... B23B 5/32; B23B 21/00
[52] U.S. Cl. ....................................... 82/105; 82/134; 82/137; 82/165
[58] Field of Search ................. 82/104, 105, 133, 134, 82/137, 139

[56] References Cited

U.S. PATENT DOCUMENTS

| | | | |
|---|---|---|---|
| 2,622,378 | 12/1952 | Stanley et al. | 82/105 |
| 3,982,164 | 9/1976 | De Buhr et al. | 318/52 |
| 4,347,769 | 9/1982 | Dombrowski et al. | 82/105 |
| 4,399,724 | 8/1983 | Dombrowski | 82/105 |
| 4,697,091 | 9/1987 | Tamura | 318/52 |

Primary Examiner—William Terrell
Attorney, Agent, or Firm—Max Fogiel

[57] ABSTRACT

A below-floor lathe for reprofiling the rims of railroad-vehicle wheel sets, with four driven friction rollers, two rotating supports, and controls. The friction rollers can be forced in pairs against the outer surface of each rim in a wheel set. A detector determines the level of slippage that occurs between a friction roller and a rim surface and varies the rate at which the rotating supports advance in accordance with the level of slippage detected.

5 Claims, 2 Drawing Sheets

BELOW-FLOOR LATHE FOR REGRINDING THE TIRES OF RAILROAD-VEHICLE WHEEL SETS

BACKGROUND OF THE INVENTION

The invention concerns a below-floor lathe for reprofiling the rims of railroad-vehicle wheel-sets, with four driven friction rollers, two turning tool supports, and controls, whereby the friction rollers can be forced in pairs against the outer surface of each wheel rim in a wheel set.

A below-floor lathe of the aforesaid type is known from the July 1987 version of Hoesch Maschinenfabrik Deutschland AG Brochure 222.

The driven friction rollers in a lathe of this type establish the rotation and cutting motion of the wheel set.

The frictional forces transferred to the wheel set by the friction rollers are relatively small because, first, the supporting force of the friction rollers must not exceed the maximum axial load on the wheel set and, second, the coefficient of friction between the friction rollers and the surface of the rims is low. The coefficient of friction is especially detrimentally affected when dirt and/or grease adheres to the surface of the rims.

Since the coefficient of friction fluctuates widely, the friction rollers will sometimes slide over the surface of the rims while a wheel set is being machined in the known lathe. The drawback is that it takes longer to machine the wheel set.

SUMMARY OF THE INVENTION

The object of the present invention is to improve an under-floor wheel-set lathe to the extent that the friction rollers will not slide over the surface of the rim while a wheel set is being machined.

This object is attained in accordance with the invention by means of a device that detects slippage between a friction roller and the surface of a rim and varies the rate at which the turning tool support advanced in accordance with the detected slippage.

The device in accordance with the invention has a sensor that senses the peripheral speed of a friction roller, a sensor that senses the peripheral speed of a rim surface, and a processor.

It is practical for the sensor that senses the peripheral speed of a friction roller to be a tachometer.

The sensor that senses the peripheral speed of the surface of a rim contains a sensing roller.

BRIEF DESCRIPTION OF THE DRAWINGS

One embodiment of the invention will now be described in detail with reference to a schematic drawing, wherein.

DESCRIPTION OF THE PREFERRED EMBODIMENT

Figure 1:
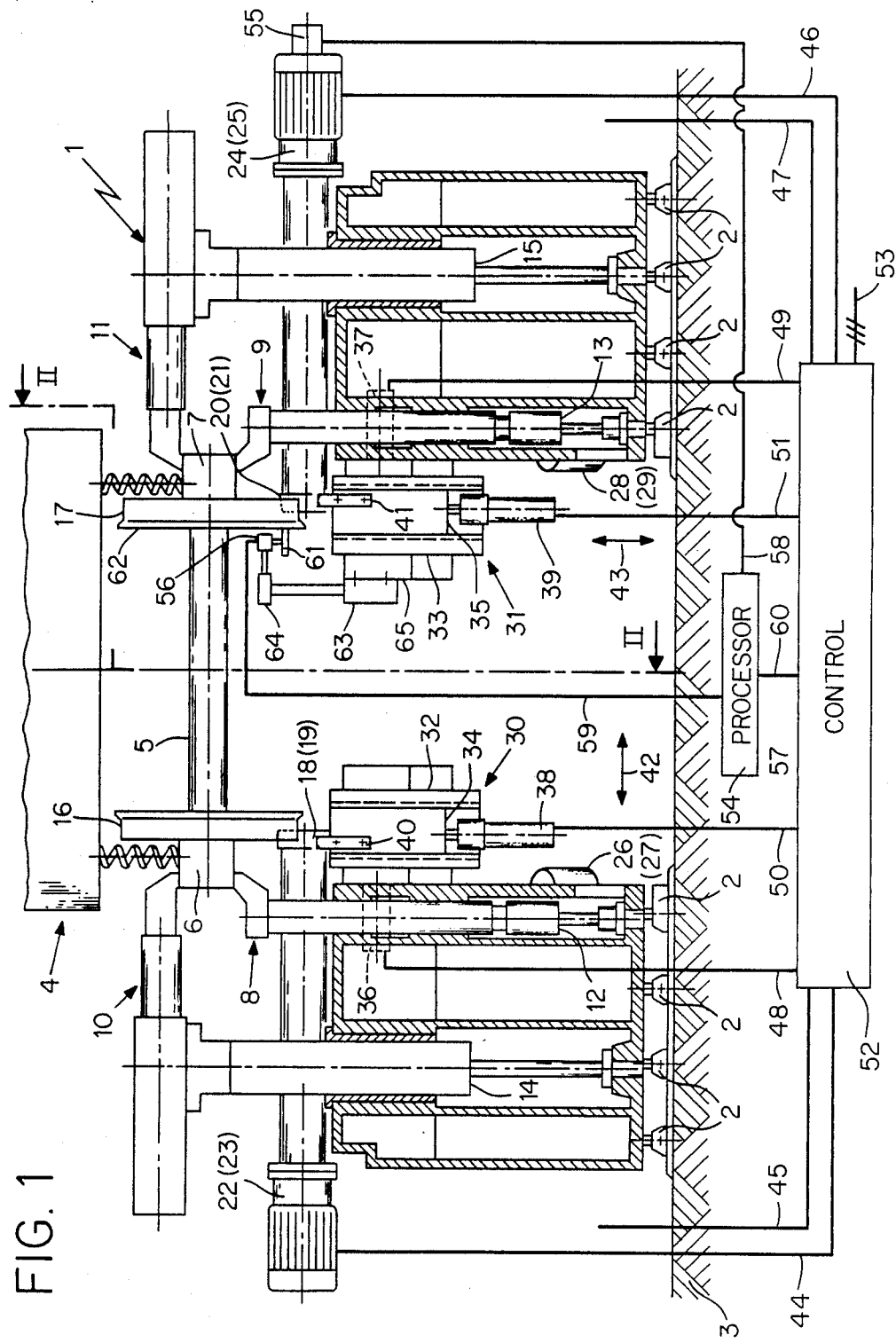
FIG. 1 is a longitudinal section through a below-floor wheel-set lathe accommodating a railroad-vehicle wheel set, a view of part of the vehicle superstructure resting on the wheel set, and a section through part of a base
Figure 2:
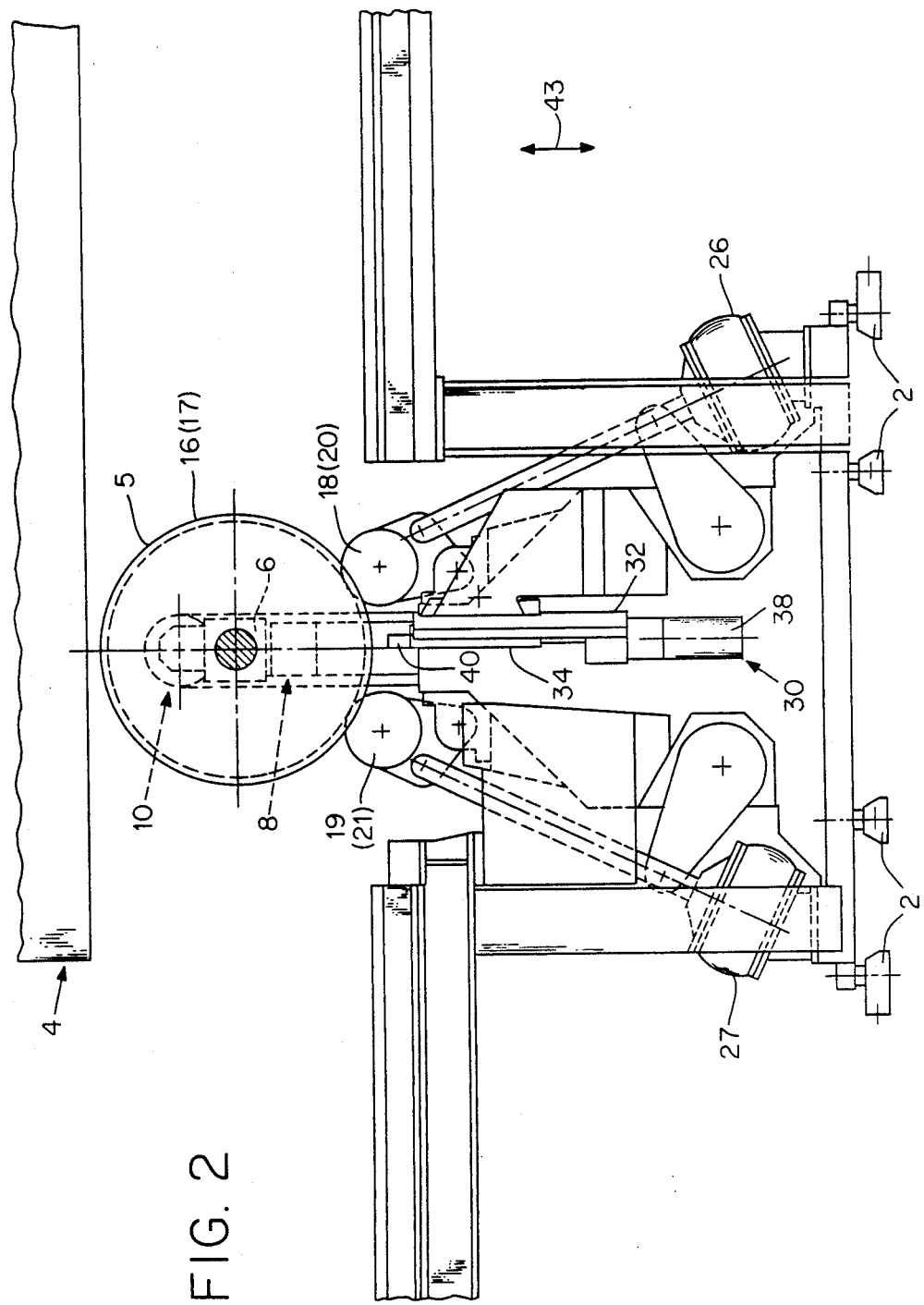
FIG. 2 is a section along the line II—II in FIG. 1.

A below-floor wheel-set lathe 1 rests on several supports 2 that rest on a base 3 and can be moved up and down and side to side.

A wheel set 5 that is mounted on a railroad vehicle 4 is secured at its axle-bearing boxes 6 and 7 by two supports 8 and 9 and two pressure-application mechanisms 10 and 11.

Each support 8 and 9 and pressure-application mechanism 10 and 11 has a hydraulic cylinder 12, 13, 14, and 15.

Each rim surface 16 and 17 in wheel set 5 is engaged by two pivoting friction rollers 18, 19, 20, and 21, each driven by a motor 22, 23, 24, and 25.

Associated with each friction roller 18, 19, 20, and 21 is a pivoting drive mechanism 26, 27, 28, and 29.

Lathe 1 contains two turning tool supports 30 and 31, each with a longitudinal carriage 32 and 33 and one planar carriage 34 and 35. Each longitudinal carriage 32 and 33 is driven by a motor 36 and 37 and each planar carriage by a motor 38 and 39.

Each planar carriage 34 and 35 has a turning tool 40 and 41 that travels longitudinally in the direction indicated by double-headed arrow 42 and in the planar-advance direction indicated by the double-headed arrow 43.

The motors 22 through 25 that drive friction rollers 18 through 21 and the motors 36 through 39 that drive rotating supports 30 and 31 are each connected by way of a line 44, 45, 46, 47, 48, 49, 50, and 51 to controls 52 that are supplied by a source 53 of outside current.

Lathe 1 has a detector 54 for sensing the slippage that occurs between friction roller 20 and rim surface 17.

Detector 54 has a sensor 55 for sensing the peripheral speed $v_a$ of friction roller 20, a sensor for sensing the peripheral speed $v_b$ of rim surface 17, and a processor 57.

Processor 57 is connected to sensors 55 and 56 and controls 52 by lines 58, 59, and 60. Sensor 55 is a tachometer that is coupled to motor 24.

Sensor 56 has a sensing roller 61 that is forced against the inner surface 62 of rim surface 17. The pressure of sensing roller 61 acts on a displacing mechanism 64 mounted on a lifting mechanism 63. Lifting mechanism 63 is screwed to the frame 65 of rotating support 31.

When lathe 1 is idling, the peripheral speed $v_a$ of friction roller 20 almost equals the peripheral speed $v_b$ of rim surface 17 because the frictional forces that are to be transmitted to wheel set 5 are very weak. Processor 57 compensates for this situation by constructing the quotient $$q = (v_a - v_c)/v_a$$
$$= v_b/v_a$$
$$\approx 1$$

wherein $V_a$ is the peripheral speed of friction roller 20, $V_b$ is the peripheral speed of rim surface 17, and $V_c$ is the rate of slippage.

Processor 57 determines the level of slippage between driven friction roller 20 and rim surface 17 while wheel set 5 is being ground by constructing the quotient $$q_1 = (V_{a1} - V_{c1})/V_{a1} = V_{b1}/V_{a1}.$$

The processor then establishes the rate of advance of rotating supports 30 and 31 on the basis of $q_1$.

If for example quotient $q_1$ becomes smaller while the wheel set is being machined, processor 57 will prevent friction rollers 18 to 21 from slipping against rim surfaces 16 and 17 by reducing the rate of advance. As quotient $q_1$ increases, processor 57 will increase the rate of advance to improve the output of the lathe.

We claim:

1. A below-floor turning lathe for reprofiling railroad-vehicle wheel sets having wheels with rims comprising: four driven friction rollers; two turning tool supports; and control means; each rim having an outer surface; means for forcing said friction rollers in pairs against the outer surface of each wheel rim in a wheelset to rotate the wheels; detector means for determining the level of slippage occurring between a friction roller and a rim outer surface; said turning tool supports including means for advancing turning tools against said rim outer surface said control means varying the rate at which said turning tool supports advance the turning tools against said rim outer surface dependent on the amount of slippage detected by said detector means so that reprofiling of said wheel sets occurs in minimum time without interruptions in operation by preventing said friction rollers from sliding over the rim outer surface during reprofiling of a wheelset.

2. A below-floor turning lathe as defined in claim 1, wherein said detector means comprises a sensor for sensing peripheral speeds of a friction roller, a sensor for sensing the peripheral speeds of a rim surface.

3. A below-floor lathe as defined in claim 2, wherein said sensor for sensing peripheral speeds of a friction roller comprises a tachometer.

4. A below-floor lathe as defined in claim 2, wherein said sensor for sensing peripheral speeds of a rim surface comprises a sensing roller.

5. A below-floor turning lathe for reprofiling railroad-vehicle wheel sets having wheels with rims comprising: four driven friction rollers; two turning tool supports; and control means; each rim having an outer surface; means for forcing said friction rollers in pairs against the outer surface of each wheel rim in a wheelset; detector means for determining the level of slippage occurring between a friction roller and a rim outer surface; said control means varying the rate at which said turning supports advance against said rim outer surface dependent on the amount of slippage detected by said detector means so that reprofiling of said wheel sets occurs in minimum time without interruptions in operation by preventing said friction rollers from sliding over the rim outer surface during reprofiling of a wheelset; said detector means comprising a sensor for sensing peripheral speeds of a friction roller, and a sensor for sensing peripheral speeds of the rim surface; said sensor for sensing peripheral speeds of a friction roller being a tachometer; said sensor for sensing peripheral speeds of a rim surface comprising a sensing roller.

* * * * *